US012803615B2

(12) United States Patent
Li et al.

(10) Patent No.: US 12,803,615 B2
(45) Date of Patent: Nov. 17, 2026

(54) TRANSCEIVER APPARATUS, WIRELESS COMMUNICATION APPARATUS, AND CHIPSET

(71) Applicant: Huawei Technologies Co., Ltd., Shenzhen (CN)

(72) Inventors: Di Li, Shenzhen (CN); Keji Cui, Shenzhen (CN); Kefeng Han, Shenzhen (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 556 days.

(21) Appl. No.: 17/929,613

(22) Filed: Sep. 2, 2022

(65) Prior Publication Data

US 2022/0416835 A1 Dec. 29, 2022

Related U.S. Application Data

(63) Continuation of application No. PCT/CN2020/078301, filed on Mar. 6, 2020.

(51) Int. Cl.
*H04B 1/48* (2006.01)

(52) U.S. Cl.
CPC .................................... *H04B 1/48* (2013.01)

(58) Field of Classification Search
CPC .................................. H04B 1/18; H04B 1/48
See application file for complete search history.

(56) References Cited

U.S. PATENT DOCUMENTS 8,274,147 B2 * 9/2012 Rofougaran ......... H05K 1/0237 333/108
8,838,042 B2 * 9/2014 Lu ............................ H04B 1/48 455/73
10,511,344 B1 * 12/2019 Korol ........................ H04B 3/04
10,581,478 B1 * 3/2020 Tam ..................... H04B 1/0458
2004/0232982 A1 * 11/2004 Ichitsubo ................ H01L 24/49 330/129
2014/0213200 A1 * 7/2014 Brinkhoff ................ H04B 1/48 455/83
2016/0254838 A1 9/2016 Reisner et al.
2017/0331188 A1 11/2017 Yin

FOREIGN PATENT DOCUMENTS

CN 101753157 A 6/2010
CN 102709264 A 10/2012
CN 103026634 A 4/2013
EP 1944829 A2 7/2008

* cited by examiner

*Primary Examiner* — Patrick C Chen
(74) *Attorney, Agent, or Firm* — Slater Matsil, LLP

(57) ABSTRACT

A transceiver includes a package substrate and a die, and a transceiver switch is disposed in the transceiver. The transceiver switch includes an antenna feedpoint, a transmit feedpoint and a receive feedpoint that are coupled to the antenna feedpoint, and a first metal connection line disposed on the package substrate, and the antenna feedpoint and the receive feedpoint are disposed at two ends of the first metal connection line. The transceiver switch further includes a first switch, a transmit pad, and a receive pad that are disposed on the die, a first terminal of the first switch is coupled to the receive pad, a second terminal of the first switch is coupled to a ground terminal of the die, the receive pad is coupled to the receive feedpoint, and the transmit pad is coupled to the transmit feedpoint.

20 Claims, 8 Drawing Sheets

(a)

(b)

(a)

(b)

(a)

(b)

(a)

(b)

(a)

(b)

(a)

(b)

TRANSCEIVER APPARATUS, WIRELESS COMMUNICATION APPARATUS, AND CHIPSET

CROSS-REFERENCE TO RELATED APPLICATIONS

This application is a continuation of International Application No. PCT/CN2020/078301, filed on Mar. 6, 2020, the disclosure of which is hereby incorporated by reference in its entirety.

TECHNICAL FIELD

This application relates to the field of electronic technologies, and in particular, to a transceiver apparatus, a wireless communication apparatus, and a chipset.

BACKGROUND

A radio frequency front-end transceiver applied to a time division duplex (TDD) operation mode requires a transceiver switch to switch between a receive mode and a transmit mode. Application of a millimeter wave band requires a transceiver switch working in the millimeter wave band. A conventional transceiver switch working in a millimeter wave band is usually designed based on a principle of a λ/4 transmission line, or based on a principle of a λ/4 transmission line including an inductor and a capacitor.

However, in an integrated circuit, passive components such as a λ/4 transmission line or an inductor in the transceiver switch are implemented through routing in a die. The passive components occupy a large chip area. In addition, due to a low quality factor of an on-chip passive device, an insertion loss of the transceiver switch is large, which directly affects transmission efficiency of a transmitter and receiving sensitivity of a receiver.

SUMMARY

This application provides a transceiver apparatus, a wireless communication apparatus, and a chipset, to reduce a chip area occupied by a transceiver switch and an insertion loss of the transceiver switch.

To achieve the foregoing objective, this application uses the following technical solutions.

According to a first aspect, a transceiver apparatus is provided, including a package substrate and a die, and a transceiver switch is disposed in the apparatus. The transceiver switch includes an antenna feedpoint, a transmit feedpoint and a receive feedpoint that are coupled to the antenna feedpoint, and a first metal connection line that are disposed on the package substrate, and the antenna feedpoint and the receive feedpoint are disposed at two ends of the first metal connection line. The transceiver switch further includes a first switch, a transmit pad, and a receive pad that are disposed on the die, a first terminal of the first switch is coupled to the receive pad, a second terminal of the first switch is coupled to a ground terminal of the die, the receive pad is coupled to the receive feedpoint, and the transmit pad is coupled to the transmit feedpoint. A power amplifier PA and a low noise amplifier LNA are further disposed on the die, the transmit pad is coupled to an output terminal of the PA, and the receive pad is coupled to an input terminal of the LNA.

In the foregoing technical solutions, when the first switch is open, the LNA is connected to the antenna feedpoint by using the transceiver switch, and the PA may be in a high-impedance state. In this case, the transceiver apparatus serves as a receiver, and may be configured to receive a signal by using an antenna connected to the antenna feedpoint. When the first switch is closed, the LNA is in an off state, and the PA is connected to the antenna feedpoint by using the transceiver switch. In this case, the transceiver apparatus serves as a transmitter, and may be configured to transmit a signal by using the antenna connected to the antenna feedpoint. Therefore, the transceiver apparatus may use the transceiver switch to implement a function of receiving or transmitting a signal. In addition, the first metal connection line in the transceiver switch is disposed on the package substrate. Therefore, a die area occupied by the transceiver switch can be reduced, a quality factor of the first metal connection line can be increased, and an insertion loss of the transceiver switch can be reduced. Further, when the transceiver apparatus uses the transceiver switch to implement receiving or transmitting, receiving sensitivity and transmission efficiency can be ensured.

In a possible implementation of the first aspect, the first metal connection line is a first transmission line whose length is equal to a ¼ wavelength. Optionally, the first transmission line is a meander line. In the possible implementation, when the first metal connection line in the transceiver switch is the first transmission line, the die area occupied by the transceiver switch based on a principle of a transmission line can be reduced, and a chip area of the transceiver apparatus can further be reduced.

In a possible implementation of the first aspect, the transceiver switch further includes a second transmission line disposed on the package substrate, where a length of the second transmission line is equal to a ¼ wavelength, and the antenna feedpoint and the transmit feedpoint are disposed at two ends of the second transmission line; and a second switch disposed on the die, where a first terminal of the second switch is coupled to the transmit pad, and a second terminal of the second switch is coupled to the ground terminal of the die. In the possible implementation, the first switch and the second switch in the transceiver switch are controlled to be closed or open, so that the transceiver apparatus can receive or transmit a signal. In addition, when the transceiver apparatus serves as a receiver, the PA does not need to be in a high-impedance state and can enable a transmit link to be in an off state. This can reduce complexity of the PA, and reduce the die area occupied by the transceiver switch and the insertion loss.

In a possible implementation of the first aspect, the transceiver switch further includes a first transformer disposed on the die, and the LNA includes a first LNA and a second LNA. The first transformer includes a first primary coil and a first secondary coil, the first primary coil is coupled between the receive pad and the ground terminal of the die, and a first end of the first secondary coil is coupled to an input end of the first LNA and an input end of the second LNA. Optionally, the first LNA is configured to receive a radio frequency signal in a first frequency band, the second LNA is configured to receive a radio frequency signal in a second frequency band, and the first frequency band is different from the second frequency band. Further, the first frequency band and the second frequency band are different and do not overlap. For example, the first frequency band is n257 or n258, and the second frequency band is n259 or n260. In the possible implementation, the input end of the first LNA may be coupled to the input end of the second LNA by using the first transformer, so that the transceiver apparatus can simultaneously receive signals in different frequency bands. This can improve performance of the transceiver apparatus.

In a possible implementation of the first aspect, the transceiver switch further includes a first transistor disposed on the die, an electrode of the first transistor is coupled to the input end of the first LNA and the input end of the second LNA, the other electrode of the first transistor is coupled to the ground terminal of the die, and a control end of the first transistor is coupled to the first end of the first secondary coil. Optionally, a center tap of the first secondary coil is coupled to a power supply terminal of the die. Optionally, a second end of the first secondary coil is coupled to the ground terminal of the die by using a decoupling capacitor. In the possible implementation, the first LNA and the second LNA are coupled to the first transformer by using the first transistor, to improve coupling performance. In addition, the first transistor may be configured to amplify a received signal, to improve a signal-to-noise ratio of the received signal.

In a possible implementation of the first aspect, the transceiver switch further includes a second transformer disposed on the die, and the PA includes a first PA and a second PA. The second transformer includes a second primary coil and a second secondary coil, the second primary coil is coupled between the transmit pad and the ground terminal of the die, a first end of the second secondary coil is separately coupled to a positive differential output terminal of the first PA and a positive differential output terminal of the second PA, and a second end of the second secondary coil is separately coupled to a negative differential output terminal of the first PA and a negative differential output terminal of the second PA. Optionally, the first PA is configured to transmit a radio frequency signal in the first frequency band, the second PA is configured to transmit a radio frequency signal in the second frequency band, and the first frequency band is different from the second frequency band. Further, the first frequency band and the second frequency band are different and do not overlap. For example, the first frequency band is n257 or n258, and the second frequency band is n259 or n260. In the possible implementation, the first PA may be coupled to the second PA by using the second transformer, and a differential output may be converted into a single-ended output, so that the transceiver apparatus can simultaneously transmit signals in different frequency bands. This can improve performance of the transceiver apparatus.

In a possible implementation of the first aspect, the transceiver switch further includes a second transistor and a third transistor that are disposed on the die, an electrode of the second transistor is coupled to the first end of the second secondary coil, the other electrode of the second transistor is separately coupled to the positive differential output terminal of the first PA and the positive differential output terminal of the second PA, an electrode of the third transistor is couple to the second end of the second secondary coil, and the other electrode of the third transistor is separately coupled to the negative differential output terminal of the first PA and the negative differential output terminal of the second PA. Optionally, a center tap of the second secondary coil is coupled to the power supply terminal of the die. In the possible implementation, the first PA and the second PA are coupled to the second transformer by using the second transistor and the third transistor, to improve coupling performance.

In a possible implementation of the first aspect, the first metal connection line is an inductor. In the possible implementation, when the first metal connection line in the transceiver switch is the inductor, the die area occupied by the transceiver switch based on a principle of a transmission line including an inductor and a capacitor can be reduced, and a chip area of the transceiver apparatus can further be reduced.

In a possible implementation of the first aspect, the transceiver switch further includes a matching capacitor disposed on the package substrate, one end of the matching capacitor is coupled to the antenna feedpoint, and the other end of the matching capacitor is coupled to a ground terminal of the package substrate. In the possible implementation, a received signal or a transmitted signal of the transceiver apparatus may be filtered by using the matching capacitor, to improve a signal-to-noise ratio of the received signal or the transmitted signal.

In a possible implementation of the first aspect, the transceiver switch further includes a first coil and a second coil that are disposed on the die and that are coupled to each other, two ends of the first coil are separately coupled to the positive differential output terminal and the negative differential output terminal of the PA, and two ends of the second coil are separately coupled to the transmit pad and the ground terminal of the die. Optionally, a center tap of the first coil is coupled to the power supply terminal of the die. In the possible implementation, the first coil and the second coil that are coupled to each other may convert a differential output of the PA into a single-ended output. This can improve performance of the transceiver apparatus.

In a possible implementation of the first aspect, the antenna feedpoint is connected to an antenna, and the antenna is disposed on the package substrate.

In a possible implementation of the first aspect, the transceiver apparatus includes a plurality of channels, and each of the plurality of channels includes the transceiver switch, the PA, and the LNA. Optionally, a plurality of antenna feedpoints in the plurality of channels are respectively connected to a plurality of antennas, and the plurality of antennas are disposed on the package substrate. In the possible implementation, the transceiver apparatus may be applied to a phased array system. Passive components such as transmission lines or inductors in the plurality of channels in the apparatus are all disposed on the package substrate. In comparison with the conventional technology, an area of a transmission line or an inductor with a length of ¼ wavelength can be saved in each channel. This can greatly reduce a chip area of the phased array system, improve the quality factor of the transceiver switch, and reduce the insertion loss.

According to a second aspect, a wireless communication apparatus is provided. For example, the wireless communication apparatus may be a terminal or a base station. The wireless communication apparatus includes a baseband processing chip (or a baseband processor), and a transceiver apparatus including a package substrate and a die, and the transceiver apparatus is coupled to the baseband processing chip. A transceiver switch is disposed in the apparatus. The transceiver switch includes an antenna feedpoint, a transmit feedpoint and a receive feedpoint that are coupled to the antenna feedpoint, and a first metal connection line that are disposed on the package substrate, and the antenna feedpoint and the receive feedpoint are disposed at two ends of the first metal connection line. The transceiver switch further includes a first switch, a transmit pad, and a receive pad that are disposed on the die, a first terminal of the first switch is coupled to the receive pad, a second terminal of the first switch is coupled to a ground terminal of the die, the receive pad is coupled to the receive feedpoint, and the transmit pad is coupled to the transmit feedpoint. A power amplifier PA and a low noise amplifier LNA are further disposed on the die, the transmit pad is coupled to an output terminal of the PA, and the receive pad is coupled to an input terminal of the LNA.

In a possible implementation of the second aspect, the first metal connection line is a first transmission line whose length is equal to a ¼ wavelength. Optionally, the first transmission line is a meander line.

In a possible implementation of the second aspect, the transceiver switch further includes a second transmission line disposed on the package substrate, where a length of the second transmission line is equal to a ¼ wavelength, and the antenna feedpoint and the transmit feedpoint are disposed at two ends of the second transmission line; and a second switch disposed on the die, where a first terminal of the second switch is coupled to the transmit pad, and a second terminal of the second switch is coupled to the ground terminal of the die.

In a possible implementation of the second aspect, the transceiver switch further includes a first transformer disposed on the die, and the LNA includes a first LNA and a second LNA. The first transformer includes a first primary coil and a first secondary coil, the first primary coil is coupled between the receive pad and the ground terminal of the die, and a first end of the first secondary coil is coupled to an input end of the first LNA and an input end of the second LNA. Optionally, the first LNA is configured to receive a radio frequency signal in a first frequency band, the second LNA is configured to receive a radio frequency signal in a second frequency band, and the first frequency band is different from the second frequency band. Further, the first frequency band and the second frequency band are different and do not overlap.

In a possible implementation of the second aspect, the transceiver switch further includes a first transistor disposed on the die, an electrode of the first transistor is coupled to the input end of the first LNA and the input end of the second LNA, the other electrode of the first transistor is coupled to the ground terminal of the die, and a control end of the first transistor is coupled to the first end of the first secondary coil. Optionally, a center tap of the first secondary coil is coupled to a power supply terminal of the die. Optionally, a second end of the first secondary coil is coupled to the ground terminal of the die by using a decoupling capacitor.

In a possible implementation of the second aspect, the transceiver switch further includes a second transformer disposed on the die, and the PA includes a first PA and a second PA. The second transformer includes a second primary coil and a second secondary coil, the second primary coil is coupled between the transmit pad and the ground terminal of the die, a first end of the second secondary coil is separately coupled to a positive differential output terminal of the first PA and a positive differential output terminal of the second PA, and a second end of the second secondary coil is separately coupled to a negative differential output terminal of the first PA and a negative differential output terminal of the second PA. Optionally, the first PA is configured to transmit a radio frequency signal in the first frequency band, the second PA is configured to transmit a radio frequency signal in the second frequency band, and the first frequency band is different from the second frequency band. Further, the first frequency band and the second frequency band are different and do not overlap.

In a possible implementation of the second aspect, the transceiver switch further includes a second transistor and a third transistor that are disposed on the die, an electrode of the second transistor is coupled to the first end of the second secondary coil, the other electrode of the second transistor is separately coupled to the positive differential output terminal of the first PA and the positive differential output terminal of the second PA, an electrode of the third transistor is couple to the second end of the second secondary coil, and the other electrode of the third transistor is separately coupled to the negative differential output terminal of the first PA and the negative differential output terminal of the second PA. Optionally, a center tap of the second secondary coil is coupled to the power supply terminal of the die.

In a possible implementation of the second aspect, the first metal connection line is an inductor.

In a possible implementation of the second aspect, the transceiver switch further includes a matching capacitor disposed on the package substrate, one end of the matching capacitor is coupled to the antenna feedpoint, and the other end of the matching capacitor is coupled to a ground terminal of the package substrate.

In a possible implementation of the second aspect, the transceiver switch further includes a first coil and a second coil that are disposed on the die and that are coupled to each other, two ends of the first coil are separately coupled to the positive differential output terminal and the negative differential output terminal of the PA, and two ends of the second coil are separately coupled to the transmit pad and the ground terminal of the die. Optionally, a center tap of the first coil is coupled to the power supply terminal of the die.

In a possible implementation of the second aspect, the antenna feedpoint is connected to an antenna, and the antenna is disposed on the package substrate.

In a possible implementation of the second aspect, the transceiver apparatus includes a plurality of channels, and each of the plurality of channels includes the transceiver switch, the PA, and the LNA. Optionally, a plurality of antenna feedpoints in the plurality of channels are respectively connected to a plurality of antennas, and the plurality of antennas are disposed on the package substrate.

According to a third aspect, a chipset is provided. The chipset includes a baseband processing chip and a transceiver apparatus including a package substrate and a die, and the transceiver apparatus is coupled to the baseband processing chip. The transceiver apparatus may be the transceiver apparatus provided in any one of the first aspect or the possible implementations of the first aspect.

According to another aspect of this application, a non-transitory computer-readable storage medium used with a computer is provided. The computer includes software for creating an integrated circuit, the computer-readable storage medium stores one or more computer-readable data structures, and the one or more computer-readable data structures include optical mask data for manufacturing the transceiver apparatus provided in any one of the first aspect or the possible implementations of the first aspect.

It may be understood that any one of the wireless communication apparatus, the chipset, the non-transitory computer-readable storage medium used with a computer, and the like includes a same or a corresponding feature of the transceiver apparatus. Therefore, for beneficial effects that can be achieved, refer to beneficial effects of the corresponding integrated circuit. Details are not described herein again.

DETAILED DESCRIPTION OF ILLUSTRATIVE EMBODIMENTS

Construction and practice of various embodiments are discussed in detail below. However, it should be understood that a plurality of applicable inventive concepts provided in this application can be implemented in a plurality of specific environments. The specific embodiments discussed are merely illustrative of specific manners to implement and use the specification and the technologies, and do not limit the scope of this application.

Unless defined otherwise, all technical and scientific terms used herein have the same meaning as commonly understood by a person of ordinary skill in the art to which this disclosure belongs.

Each circuit or another component may be described as or referred to as "configured to" perform one or more tasks. In this case, "configured to" is used to imply a structure by indicating that the circuit/component includes a structure (for example, a circuit system) that performs one or more tasks during operation. Therefore, the circuit/component can be referred to as being configured to perform the task even when the specified circuit/component is not currently operational (for example, is not on). The circuit/component used with the term "configured to" includes hardware, for example, a circuit that performs an operation.

The following describes technical solutions in embodiments of this application with reference to the accompanying drawings in embodiments of this application. In this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. At least one of the following items (pieces) or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be singular or plural. In addition, in embodiments of this application, the terms such as "first" and "second" are not intended to limit a quantity or an execution sequence.

It should be noted that, in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Specifically, usage of the word such as "example" or "for example" is intended to present a related concept in a specific manner.

Figure 1:
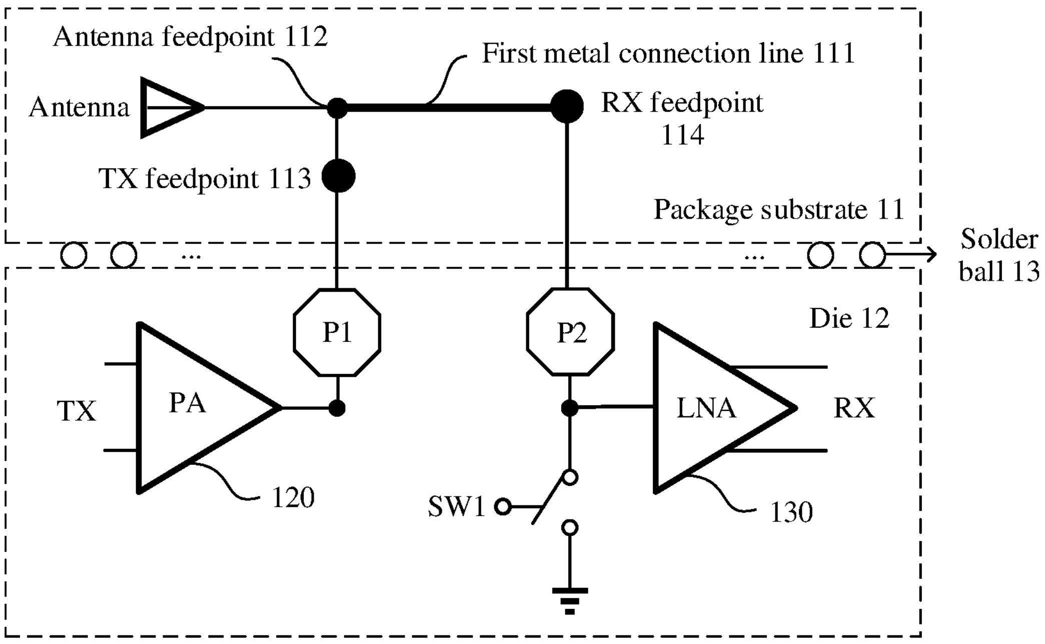
FIG. 1 is a schematic diagram of a structure of a first transceiver apparatus according to an embodiment of this application.

FIG. 1 is a schematic diagram of a structure of a transceiver apparatus according to an embodiment of this application. The transceiver apparatus includes a package substrate 11 and a die 12. Optionally, the package substrate 11 may be connected to the die 12 by using a solder ball 13.

A transceiver switch is disposed in the transceiver apparatus. The transceiver switch includes an antenna feedpoint 112, a transmit (TX) feedpoint 113 and a receive (RX) feedpoint 114 that are coupled to the antenna feedpoint 112, and a first metal connection line 11 that are disposed on the package substrate 11. The antenna feedpoint 112 and the RX feedpoint 114 are disposed at two ends of the first metal connection line 11. The antenna feedpoint 112 may be connected to an antenna (ANT), and the antenna may also be disposed on the package substrate 11. The transceiver switch further includes a first switch SW1, a transmit pad P1, and a receive pad P2 that are disposed on the die 12. A first terminal of the first switch SW1 is coupled to the receive pad P2, a second terminal of the first switch SW1 is coupled to a ground terminal of the die 12, the receive pad P2 is coupled to the RX feedpoint 114, and the transmit pad P1 is coupled to the TX feedpoint 113.

In addition, a power amplifier (PA) 120 and a low noise amplifier (LNA) 130 may further be disposed on the die 12, the transmit pad P1 is coupled to an output terminal of the PA 120, and the receive pad P2 is coupled to an input terminal of the LNA 130.

Optionally, the first switch SW1 may be a mechanical switch, a transistor switch, another switch circuit, or the like. This is not specifically limited in this embodiment of this application. The mechanical switch may be in a closed state or an open state, and the transistor switch may be in a turn-on state or a cut-off state. The turn-on state of the transistor switch corresponds to the closed state of the mechanical switch, and the cut-off state of the transistor switch corresponds to the open state of the mechanical switch. A second switch SW2 in the following is similar to the first switch.

Specifically, in the transceiver apparatus, when the first switch SW1 is open, the LNA 130 is connected to the antenna feedpoint 112 by using the transceiver switch, and the PA 120 is in a high-impedance state. In this case, the transceiver apparatus serves as a receiver, and may be configured to receive a signal by using the antenna connected to the antenna feedpoint 112. When the first switch SW1 is closed, the LNA 130 is in an off state, and the PA 120 is connected to the antenna feedpoint 112 by using the transceiver switch. In this case, the transceiver apparatus serves as a transmitter, and may be configured to transmit a signal by using the antenna connected to the antenna feedpoint 112. Therefore, the transceiver apparatus may use the transceiver switch to implement a function of receiving or transmitting a signal.

In this embodiment of this application, the first metal connection line 111 in the transceiver switch is disposed on the package substrate 11, to reduce an area of the die 12 occupied by the transceiver switch. In addition, the first metal connection line 111 is disposed on the package substrate 11. Therefore, a quality factor of the first metal connection line 111 can be increased, and an insertion loss of the transceiver switch can be reduced. Further, when the transceiver apparatus uses the transceiver switch to implement receiving or transmitting, receiving sensitivity and transmission efficiency can be ensured.

Further, the transceiver switch may be a transceiver switch designed based on a principle of a transmission line, or may be a transceiver switch designed based on a principle of a transmission line including an inductor and a capacitor. The following separately describes the transceiver switches based on the two principles.

Type 1: a transceiver switch based on a principle of a transmission line.

Figure 2:
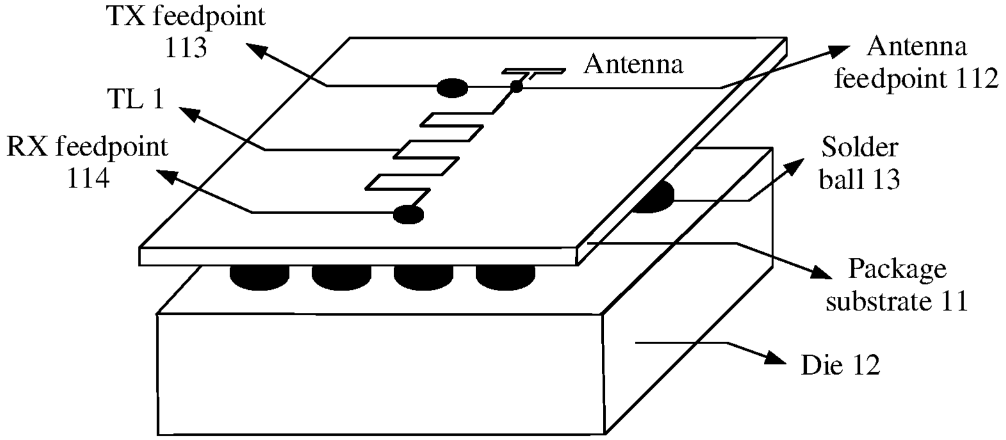
FIG. 2 is a schematic diagram of a structure of a second transceiver apparatus according to an embodiment of this application.
Figure 2:
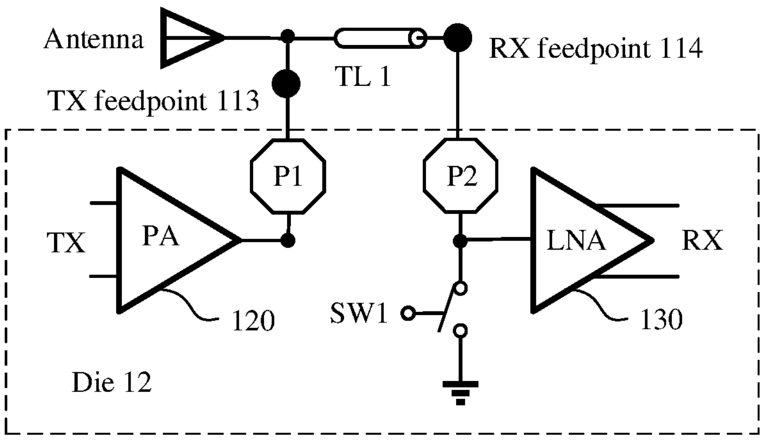

With reference to FIG. 1, as shown in FIG. 2, the first metal connection line 111 is a first transmission line (TL) TL 1 whose length is equal to a ¼ wavelength. For example, the first transmission line TL 1 may be a microstrip or a coplanar waveguide transmission line. The first transmission line TL 1 may be a meander line, that is, the first transmission line TL 1 may be routed on the package substrate 11 as a meander line. (a) in FIG. 2 is a three-dimensional diagram of the transceiver apparatus, and (b) in FIG. 2 shows a circuit structure in the die 12.

Specifically, when the first switch SW1 is open, the LNA 130 is connected to the antenna feedpoint 112 by using the transceiver switch, that is, a receive link is connected to the antenna feedpoint 112 by using the transceiver switch. In this case, the transceiver apparatus serves as a receiver, and may be configured to receive a signal by using the antenna connected to the antenna feedpoint 112. In addition, the PA 120 is set to a high-impedance state, that is, a transmit link is in a high-impedance state, to ensure that the transmit link does not affect working of the receiver. When the first switch SW1 is closed, the LNA 130 is in an off state, and the PA 120 is connected to the antenna feedpoint 112 by using the transceiver switch, that is, the receive link is connected to the antenna feedpoint 112 by using the transceiver switch. In this case, the transceiver apparatus serves as a transmitter, and may be configured to transmit a signal by using the antenna connected to the antenna feedpoint 112.

Figure 3:
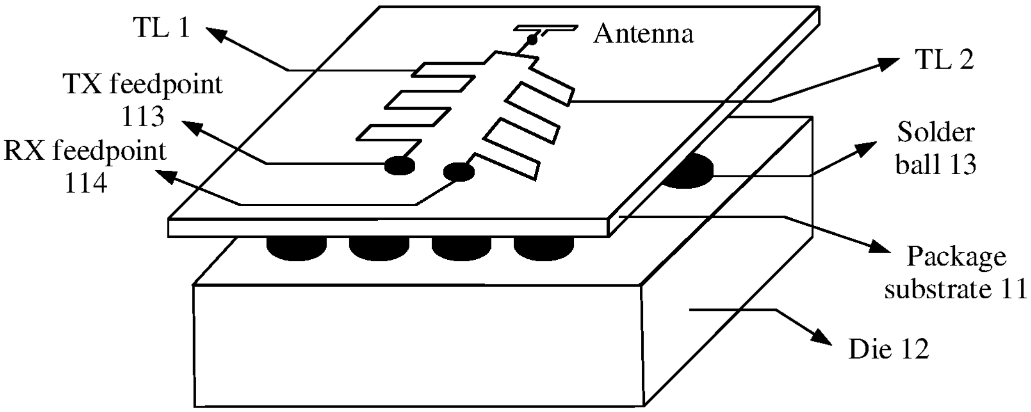
FIG. 3 is a schematic diagram of a structure of a third transceiver apparatus according to an embodiment of this application.
Figure 3:
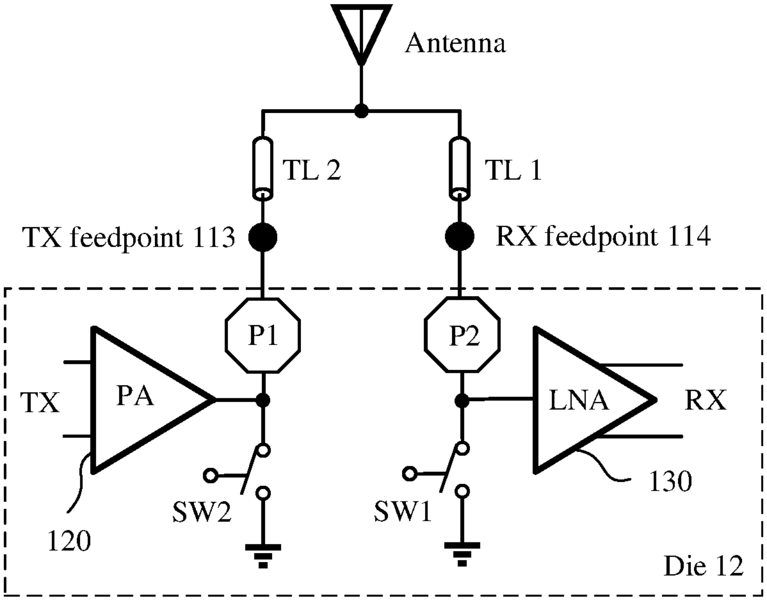

Optionally, as shown in FIG. 3, the transceiver switch further includes a second transmission line TL 2 disposed on the package substrate 11, where a length of the second transmission line TL 2 is equal to a ¼ wavelength, and the antenna feedpoint 112 and the TX feedpoint 113 are disposed at two ends of the second transmission line TL 2; and the second switch SW2 disposed on the die 12, where a first terminal of the second switch SW2 is coupled to the transmit pad P1, and a second terminal of the second switch SW2 is coupled to the ground terminal of the die 12. Optionally, the second transmission line TL 2 may also be a meander line. (a) in FIG. 3 is a three-dimensional schematic diagram of the transceiver apparatus, and (b) in FIG. 3 shows a circuit structure in the die 12.

Specifically, when the first switch SW1 is open, and the second switch SW2 is closed, the LNA 130 is connected to the antenna feedpoint 112 by using the transceiver switch, and the PA 120 is in an off state. In this case, the transceiver apparatus serves as a receiver, and may be configured to receive a signal by using the antenna connected to the antenna feedpoint 112. In addition, after passing through the second transmission line TL 2, the transmit link corresponding to the PA 120 is in a high-impedance state at the antenna feedpoint 112, so that the transmit link does not affect working of the receiver. Therefore, when the transceiver apparatus serves as a receiver, the PA does not need to be in a high-impedance state and can enable the transmit link to be in an off state. This can reduce complexity of the PA. When the first switch SW1 is closed, and the second switch SW2 is open, the PA 120 is connected to the antenna feedpoint 112 by using the transceiver switch, and the LNA 130 is in an off state. In this case, the transceiver apparatus serves as a transmitter, and may be configured to transmit a signal by using the antenna connected to the antenna feedpoint 112. In addition, after passing through the first transmission line TL 1, the receive link corresponding to the LNA 130 is in a high-impedance state at the antenna feedpoint 112, so that the receive link does not affect working of the transmitter.

In a possible implementation, the transceiver apparatus may further be configured to receive or transmit signals in a plurality of different frequency bands. For example, different frequency bands may include an n257 frequency band and an n258 frequency band near 28 GHz, and an n259 frequency band and an n260 frequency band near 39 GHz, the like. When the transceiver apparatus is configured to receive or transmit signals in a plurality of different frequency bands, the antenna connected to the antenna feedpoint 112 in the transceiver switch may use a wideband antenna, to simultaneously cover a plurality of different frequency bands. A length of a transmission line (for example, the first transmission line TL 1 and the second transmission line TL 2) in the transceiver switch may be a quarter of an intermediate value of wavelengths corresponding to a plurality of different frequency bands, to implement impedance conversion between different frequency bands.

Figure 4:
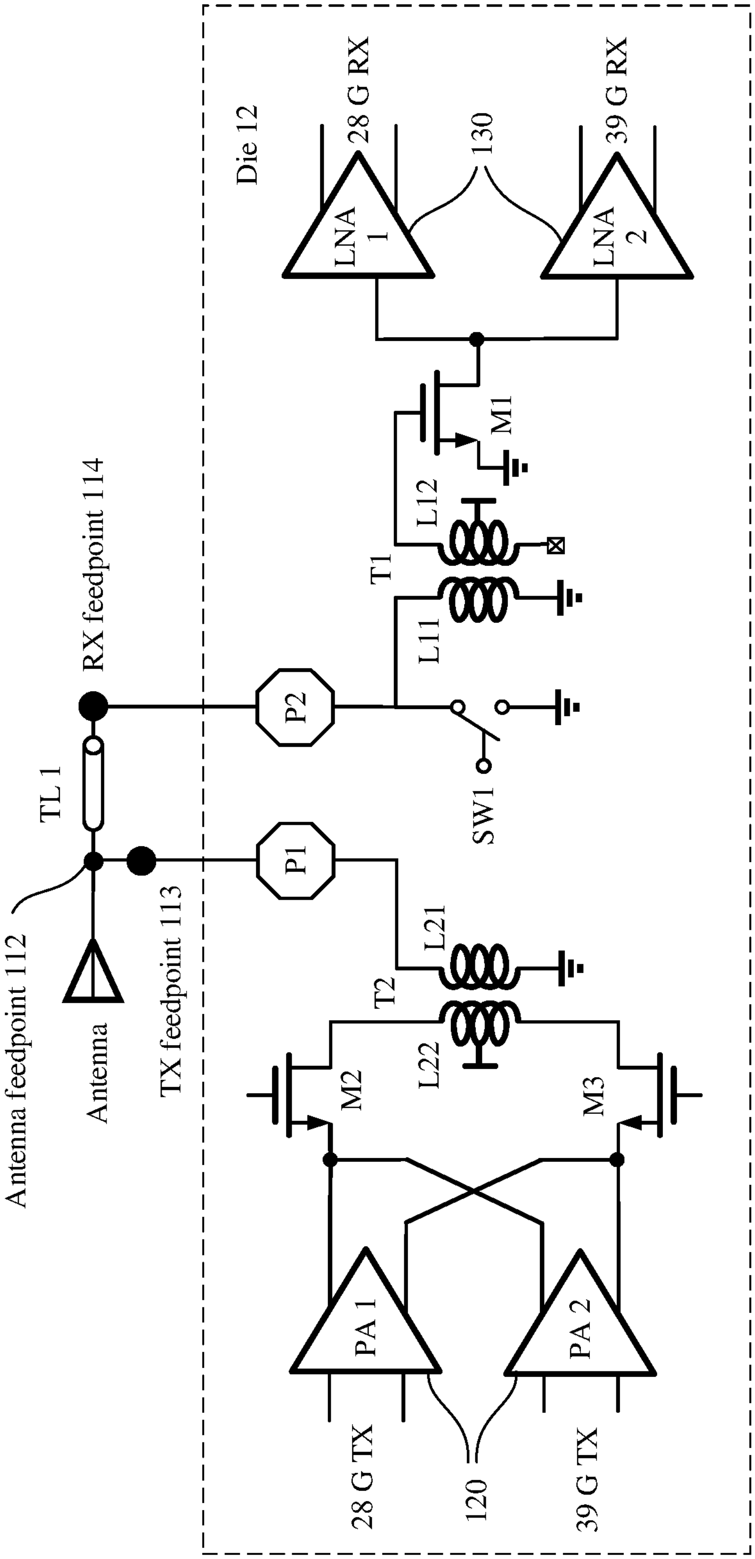
FIG. 4 is a schematic diagram of a structure of a fourth transceiver apparatus according to an embodiment of this application.

Specifically, when the transceiver apparatus may be configured to receive signals in a plurality of different frequency bands, as shown in FIG. 4, the transceiver switch may further include a first transformer T1 disposed on the die 12, and the LNA 130 includes a first LNA and a second LNA. The first transformer T1 includes a first primary coil L11 and a first secondary coil L12, the first primary coil L11 is coupled between the receive pad P2 and the ground terminal of the die 12, and a first end of the first secondary coil L12 is coupled to an input end of the first LNA and an input end of the second LNA. In FIG. 4, the first LNA is represented as an LNA 1, and the second LNA is represented as an LNA 2.

The first transformer T1 may be configured to implement impedance matching at the input end when the transceiver apparatus serves as a receiver. One end of the first primary coil L11 is grounded and may be configured to provide an electrostatic discharge (ESD) path. A second end of the first secondary coil L12 may be coupled to the ground terminal of the die 12 by using a decoupling capacitor, to be coupled to an alternating current ground or another impedance network. This is not specifically limited in this embodiment of this application.

In addition, the first LNA may be configured to receive a radio frequency signal in a first frequency band, the second LNA may be configured to receive a radio frequency signal in a second frequency band, and the first frequency band is different from the second frequency band. In FIG. 4, the input end of the first LNA is coupled to the input end of the second LNA by using the first transformer T1, so that the transceiver apparatus can simultaneously receive signals in different frequency bands by using a same antenna. The first frequency band and the second frequency band may overlap, or may not overlap. For example, the first frequency band is an n257 frequency band or an n258 frequency band near 28

GHz, and the second frequency band is an n259 frequency band or an n260 frequency band near 39 GHz.

Optionally, the transceiver switch further includes a first transistor M1 disposed on the die 12, an electrode of the first transistor M1 is coupled to the input end of the first LNA and the input end of the second LNA, the other electrode of the first transistor M1 is coupled to the ground terminal of the die 12, and a control end of the first transistor M1 is coupled to the first end of the first secondary coil L12. Further, a center tap of the first secondary coil L12 may be coupled to a power supply terminal of the die 12, and is configured to provide a bias voltage for the first transistor M1.

It should be noted that the first transistor M1 may be any transistor with an amplification function, for example, a bipolar junction transistor (BJT), a metal oxide semiconductor (MOS) transistor, an insulated gate bipolar transistor (IGBT), a junction field effect transistor (JFET), or the like. The MOS transistor may include a PMOS transistor, an NMOS transistor, or the like. When the first transistor M1 is a different type of MOS transistor, a connection relationship between a drain, a source, and a gate of the first transistor M1 may be different. This is not specifically limited in this embodiment of this application. FIG. 4 is described by using an example in which the first transistor M1 is an NMOS transistor, the drain of the NMOS transistor is coupled to the input end of the first LNA and the input end of the second LNA, the source is coupled to the ground terminal of the die 12, and the gate is coupled to the first end of the first secondary coil L12.

Specifically, when the transceiver apparatus may be configured to transmit signals in a plurality of different frequency bands, as shown in FIG. 4, the transceiver switch may further include a second transformer T2 disposed on the die 12, the PA 120 includes a first PA and a second PA, and the first PA and the second PA each have a positive differential output terminal and a negative differential output terminal. The second transformer T2 includes a second primary coil L21 and a second secondary coil L22, the second primary coil L21 is coupled between the transmit pad P1 and the ground terminal of the die 12, a first end of the second secondary coil L22 is separately coupled to the positive differential output terminal of the first PA and the positive differential output terminal of the second PA, and a second end of the second secondary coil L22 is separately coupled to the negative differential output terminal of the first PA and the negative differential output terminal of the second PA. In FIG. 4, the first PA is represented as a PA 1, and the second PA is represented as a PA 2.

The first PA and the second PA may convert a differential signal into a single-ended signal by using the second transformer T2, that is, combine differential power and convert the differential power into single-ended signal output power. The second transformer T2 may further be configured to implement impedance matching at the output end when the transceiver apparatus serves as a transmitter. One end of the second primary coil L21 is grounded and may be configured to provide an ESD path.

In addition, the first PA may be configured to transmit a radio frequency signal in the first frequency band, the second PA may be configured to transmit a radio frequency signal in the second frequency band, and the first frequency band is different from the second frequency band. In FIG. 4, the differential output terminal of the first PA is coupled to the differential output terminal of the second PA by using the second transformer T2, and a differential output is converted into a single-ended output, so that the transceiver apparatus can simultaneously transmit signals in different frequency bands by using a same antenna. The first frequency band and the second frequency band may overlap, or may not overlap. For example, the first frequency band is an n257 frequency band or an n258 frequency band near 28 GHz, and the second frequency band is an n259 frequency band or an n260 frequency band near 39 GHz.

Optionally, the transceiver switch further includes a second transistor M2 and a third transistor M3 that are disposed on the die 12, an electrode of the second transistor M2 is coupled to the first end of the second secondary coil L22, the other electrode of the second transistor M2 is separately coupled to the positive differential output terminal of the first PA and the positive differential output terminal of the second PA, an electrode of the third transistor M3 is couple to the second end of the second secondary coil L22, and the other electrode of the third transistor M3 is separately coupled to the negative differential output terminal of the first PA and the negative differential output terminal of the second PA. Further, a center tap of the second secondary coil L22 may be coupled to the power supply terminal of the die 12, and may be configured to supply power to the second transistor M2 and the third transistor M3.

It should be noted that the second transistor M2 and the third transistor M3 are similar to the first transistor M1, and may be MOS transistors, for example, PMOS transistors or NMOS transistors. When the second transistor M2 and the third transistor M3 are different types of MOS transistors, a connection relationship between a drain, a source, and a gate of the transistor may be different. This is not specifically limited in this embodiment of this application. FIG. 4 is described by using an example in which both the second transistor M2 and the third transistor M3 are NMOS transistors.

In FIG. 4, when the transceiver apparatus is configured to receive signals in different frequency bands, the first switch SW1 is open, both the first PA and the second PA are in an off state, both the first LNA and the second LNA work, and the first LNA and the second LNA may be configured to receive signals in different frequency bands by using the antenna connected to the antenna feedpoint 112. For example, the first LNA is configured to receive a signal in a frequency band near 28 GHz, and the second LNA is configured to receive a signal in a frequency band near 39 GHz. When the transceiver apparatus is configured to transmit signals in different frequency bands, the first switch SW1 is closed, both the first LNA and the second LNA are in an off state, both the first PA and the second PA work, and the first PA and the second PA may be configured to transmit signals in different frequency bands by using the antenna connected to the antenna feedpoint 112. For example, the first PA is configured to transmit a signal in a frequency band near 28 GHz, and the second PA is configured to transmit a signal in a frequency band near 39 GHz.

It should be noted that FIG. 4 is described merely by using an example in which the transceiver apparatus can receive or transmit signals in two different frequency bands, and the two different frequency bands may separately be frequency bands near 28 GHz and 39 GHz. In addition, when the transceiver apparatus may be configured to receive or transmit signals in a plurality of different frequency bands, the transceiver switch may not include the second switch SW2 and the second transmission line TL 2, or may include the second switch SW2 and the second transmission line TL 2. In this application, only an example in which the second switch SW2 and the second transmission line TL 2 are not included in FIG. 4 is used for description. FIG. 4 constitutes no limitation on this embodiment of this application.

The transceiver apparatus provided in this embodiment of this application may be applied to a transceiver system, and may receive or transmit signals in a plurality of different frequency bands. A transmission line (for example, the first transmission line TL 1 and/or the second transmission line TL 2) in the transceiver switch in the apparatus is disposed on the package substrate 11, to reduce an area of the die 12 occupied by the transceiver switch. In addition, the transmission line is disposed on the package substrate 11. Therefore, a quality factor of the transmission line can be increased, and an insertion loss of the transceiver switch can be reduced. Further, when the transceiver apparatus uses the transceiver switch to implement receiving or transmitting, receiving sensitivity and transmission efficiency can be ensured.

Further, the transceiver apparatus may include a plurality of channels, each of the plurality of channels may include the transceiver switch, the PA 120, and the LNA 130, and the plurality of channels may also be referred to as a phased array. A connection relationship between the transceiver switch, the PA 120, and the LNA 130 included in each channel may be shown in FIG. 2, FIG. 3, or FIG. 4. The following describes the plurality of channels included in the transceiver apparatus by using the connection relationship between the transceiver switch, the PA 120, and the LNA 130 in FIG. 2 and FIG. 4 as an example.

Figure 5:
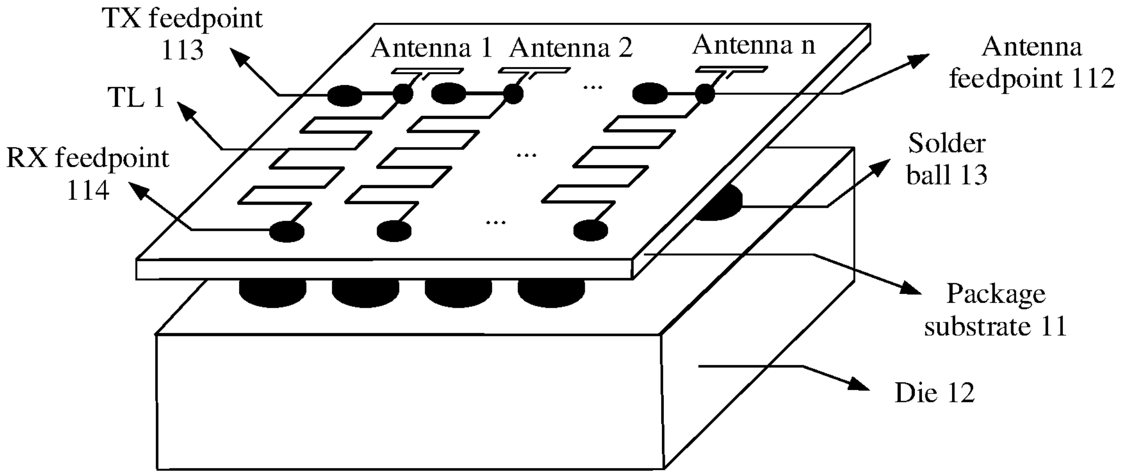
FIG. 5 is a schematic diagram of a structure of a fifth transceiver apparatus according to an embodiment of this application.
Figure 5:
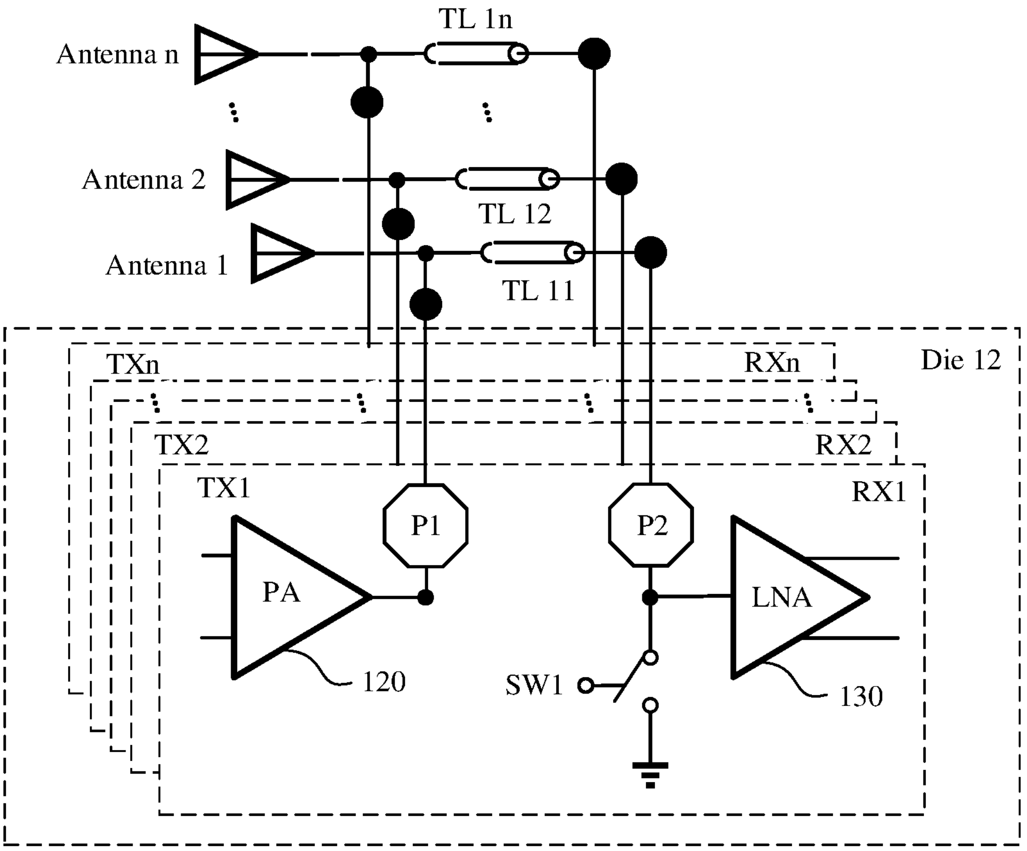

With reference to FIG. 2, as shown in FIG. 5, the transceiver apparatus includes n channels (n is a positive integer), and each channel may include one transceiver switch, one PA 120, and one LNA 130. Therefore, n transceiver switches, n PAs 120, and n LNAs 130 are correspondingly disposed in the n channels. First transmission lines TL 1 in the n transceiver switches are all disposed on the package substrate 11, and are respectively represented as a TL 11 to a TL 1*n*. Transmission links corresponding to the n PAs 120 are respectively represented as a TX1 to a TXn. Receive links corresponding to the n LNAs 130 are respectively represented as an RX1 to an RXn. In addition, antenna feedpoints 112 in the n transceiver switches are correspondingly connected to antennas, so that the n transceiver switches are correspondingly connected to the n antennas. The plurality of antennas are all disposed on the package substrate 11, and are respectively represented as an antenna 1 to an antenna n in FIG. 5. (a) in FIG. 5 is a three-dimensional schematic diagram of the transceiver apparatus, and (b) in FIG. 5 shows a circuit structure in the die 12.

Figure 6:
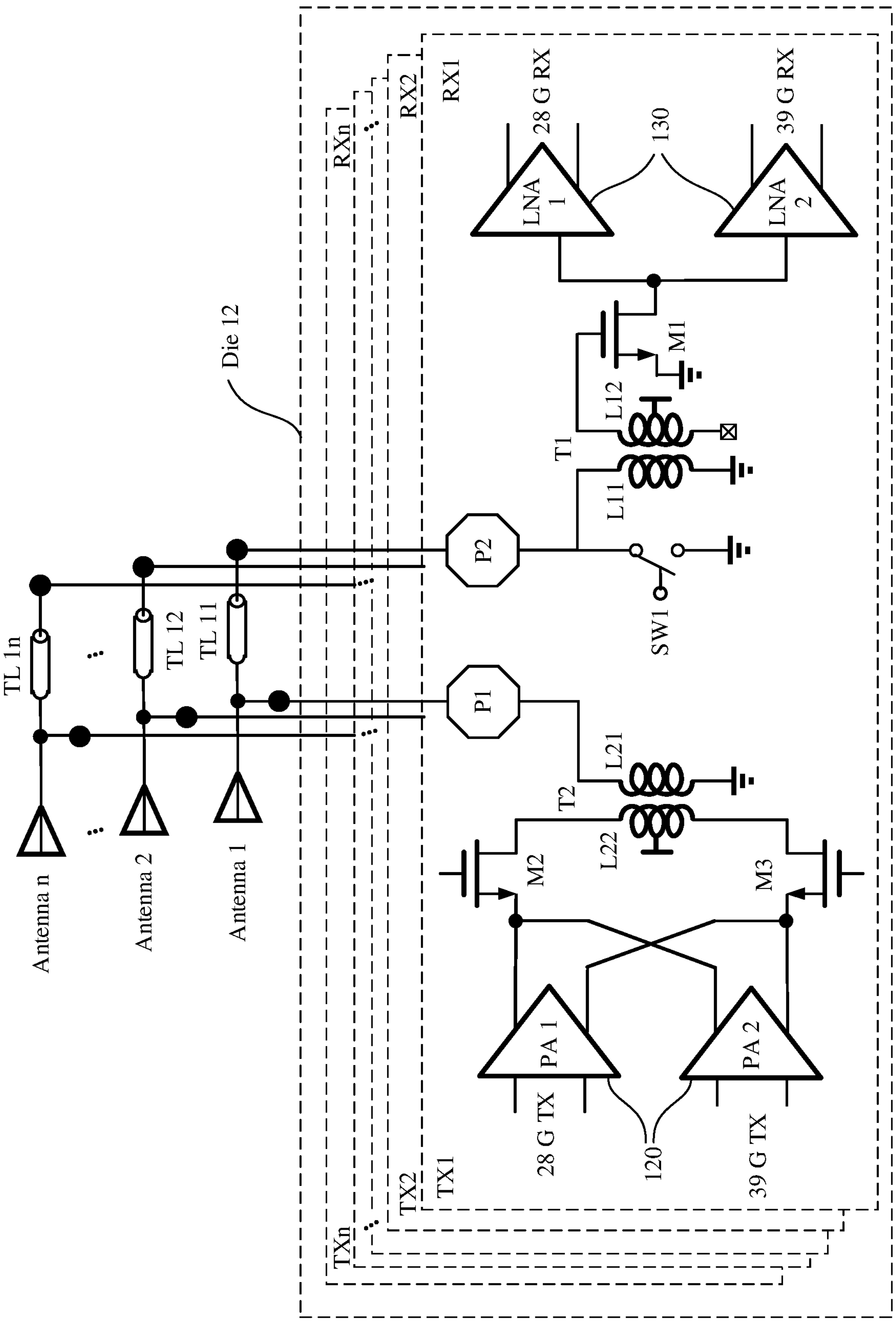
FIG. 6 is a schematic diagram of a structure of a sixth transceiver apparatus according to an embodiment of this application.

With reference to FIG. 4, as shown in FIG. 6, the transceiver apparatus includes n channels (n is a positive integer), and each channel may include one transceiver switch, one first PA, one second PA, one first LNA, and one second LNA. Therefore, n transceiver switches, n first PAs, n second PAs, n first LNAs, and n second LNAs are correspondingly disposed in the n channels. First transmission lines TL 1 in the n transceiver switches are all disposed on the package substrate 11, and are respectively represented as a TL 11 to a TL 1*n*. Transmission links corresponding to the n first PAs and the n second PAs are respectively represented as a TX1 to a TXn. Receive links corresponding to the n first LNAs and the n second LNAs are respectively represented as an RX1 to an RXn. In addition, antenna feedpoints 112 in the n transceiver switches are correspondingly connected to antennas, so that the n transceiver switches are correspondingly connected to the n antennas. The plurality of antennas are all disposed on the package substrate 11, and are respectively represented as an antenna 1 to an antenna n in FIG. 6. FIG. 6 mainly shows a circuit structure of the die 12 in the transceiver apparatus. For a three-dimensional schematic diagram corresponding to the transceiver apparatus, refer to (a) in FIG. 5.

It should be noted that, in FIG. 5 or FIG. 6, an operating principle of each of the n channels configured to receive a signal is similar to an operating principle of the transceiver apparatus serving as a receiver, and an operating principle of each channel configured to transmit a signal is similar to an operating principle of the transceiver apparatus serving as a transmitter. For details, refer to the foregoing related descriptions. Details are not described herein again in this embodiment of this application.

Each of the plurality of channels included in the transceiver apparatus may support receiving or transmission of a signal in one frequency band, or may support receiving or transmission of signals in a plurality of frequency bands. This is not specifically limited in this embodiment of this application.

In addition, when the transceiver apparatus includes the plurality of channels and is configured to receive or transmit signals in a plurality of different frequency bands, the antennas corresponding to the plurality of channels may use wideband antennas, to simultaneously cover a plurality of different frequency bands. A length of a transmission line (for example, the first transmission line TL 1 and the second transmission line TL 2) in the transceiver switch may be a quarter of an intermediate value of wavelengths corresponding to a plurality of different frequency bands, to implement impedance conversion between different frequency bands.

The transceiver apparatus provided in this embodiment of this application may be applied to a phased array system (for example, a TDD phased array system). Transmission lines (for example, the first transmission line TL 1 and the second transmission line TL 2) in the plurality of channels in the apparatus are disposed on the package substrate 11. In comparison with the conventional technology, an area of a transmission line with a length of ¼ wavelength can be saved in each channel. This can greatly reduce a chip area of the phased array system. In addition, the transmission lines in the plurality of channels are disposed on the package substrate 11. Therefore, a quality factor of the transmission line can be increased, and an insertion loss of the transceiver switch can be reduced. Further, when the transceiver apparatus uses the transceiver switch to implement receiving or transmitting, receiving sensitivity and transmission efficiency can be ensured.

Type 2: a transceiver switch based on a principle of a transmission line including an inductor and a capacitor.

Figure 7:
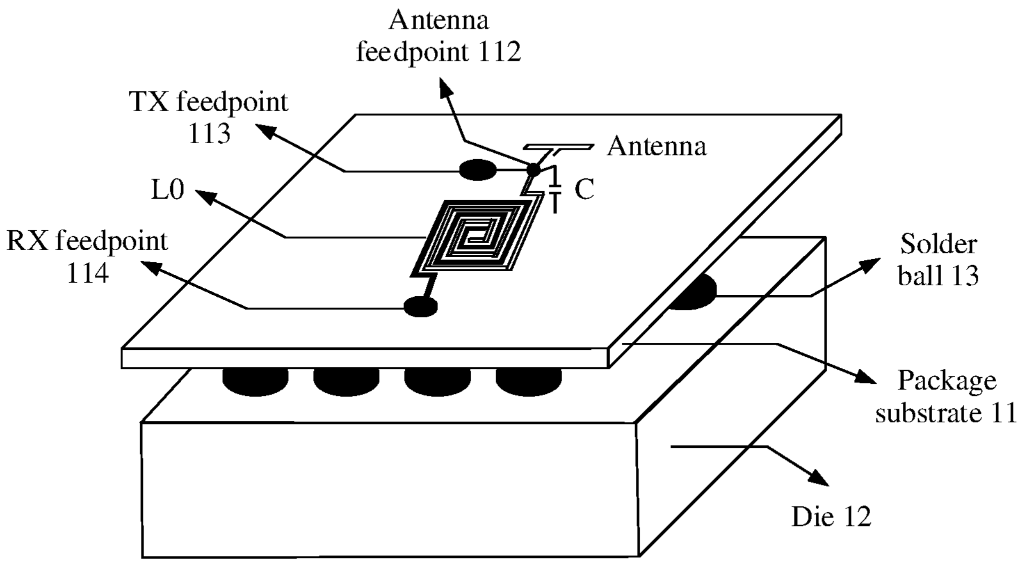
FIG. 7 is a schematic diagram of a structure of a seventh transceiver apparatus according to an embodiment of this application.
Figure 7:
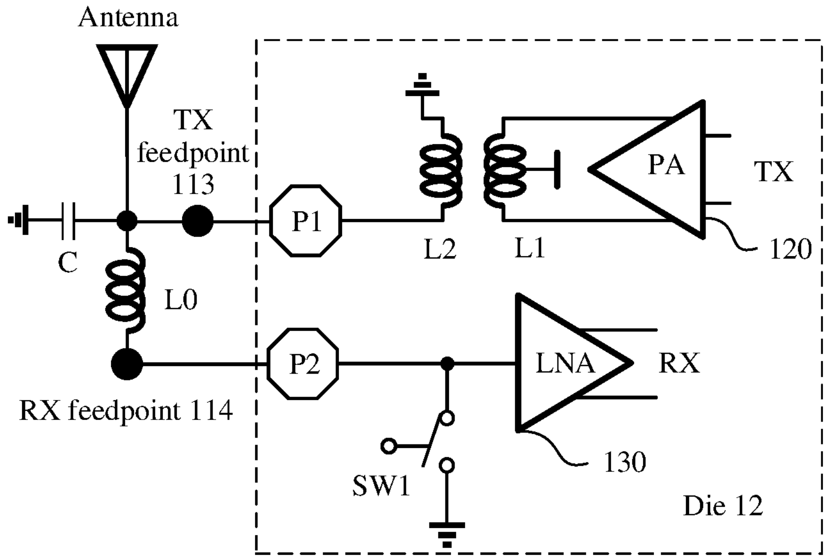

With reference to FIG. 1, as shown in FIG. 7, the first metal connection line 111 is an inductor L0. The transceiver switch may further include a matching capacitor C disposed on the package substrate, one end of the matching capacitor C is coupled to the antenna feedpoint 112, and the other end of the matching capacitor C is coupled to a ground terminal of the package substrate 11. (a) in FIG. 7 is a three-dimensional schematic diagram of the transceiver apparatus, and (b) in FIG. 7 shows a circuit structure in the die 12.

Optionally, the transceiver switch further includes a first coil L1 and a second coil L2 that are disposed on the die 12 and that are coupled to each other, two ends of the first coil L1 are separately coupled to the positive differential output terminal and the negative differential output terminal of the PA 120, and two ends of the second coil L2 are separately coupled to the transmit pad P1 and the ground terminal of the die 12.

The first coil L1 and the second coil L2 may convert a differential output of the PA 120 into a single-ended output, and may further be configured to implement impedance matching at the output end when the transceiver apparatus serves as a transmitter. In addition, a center tap of the first coil L1 may be coupled to the power supply terminal of the die 12, and may be configured to supply power to the first coil L1 and the second coil L2.

In FIG. 7, when the first switch SW1 is open, the LNA 130 is connected to the antenna feedpoint 112 by using the transceiver switch, that is, a receive link is connected to the antenna feedpoint 112 by using the transceiver switch. In this case, the transceiver apparatus serves as a receiver, and may be configured to receive a signal by using the antenna connected to the antenna feedpoint 112. In addition, the PA 120 is set to a high-impedance state, that is, a transmit link is in a high-impedance state, to ensure that the transmit link does not affect working of the receiver. When the first switch SW1 is closed, the LNA 130 is in an off state, and the PA 120 is connected to the antenna feedpoint 112 by using the transceiver switch, that is, the receive link is connected to the antenna feedpoint 112 by using the transceiver switch. In this case, the transceiver apparatus serves as a transmitter, and may be configured to transmit a signal by using the antenna connected to the antenna feedpoint 112.

The transceiver apparatus provided in this embodiment of this application may be applied to a transceiver system, the inductor L0 in the transceiver switch in the apparatus is disposed on the package substrate 11, to reduce an area of the die 12 occupied by the transceiver switch. In addition, the inductor L0 is disposed on the package substrate 11. Therefore, a quality factor of the inductor L0 can be increased, and an insertion loss of the transceiver switch can be reduced. Further, when the transceiver apparatus uses the transceiver switch to implement receiving or transmitting, receiving sensitivity and transmission efficiency can be ensured.

Further, the transceiver apparatus may include a plurality of channels, each of the plurality of channels may include the transceiver switch, the PA 120, and the LNA 130, and the plurality of channels may also be referred to as a phased array. A connection relationship between the transceiver switch, the PA 120, and the LNA 130 included in each channel may be shown in FIG. 7.

Figure 8:
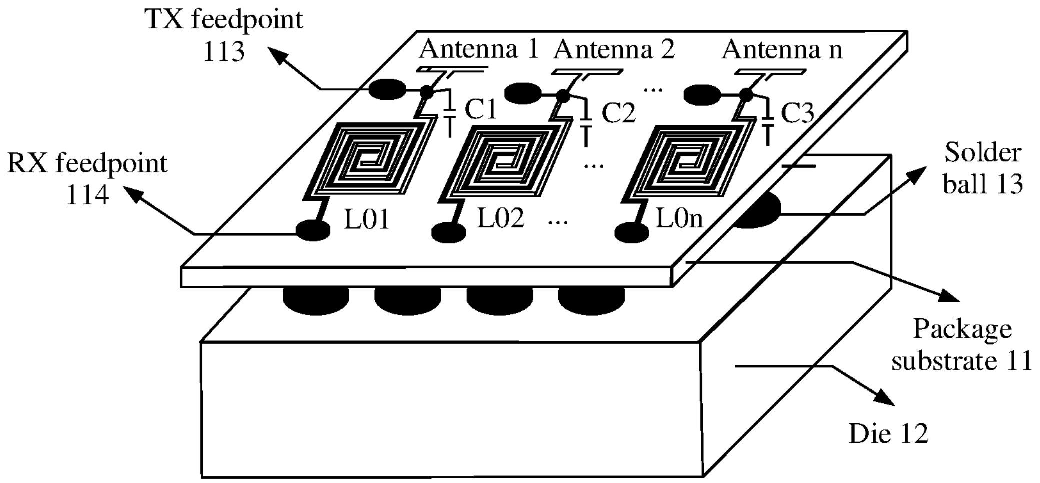
FIG. 8 is a schematic diagram of a structure of an eighth transceiver apparatus according to an embodiment of this application.
Figure 8:
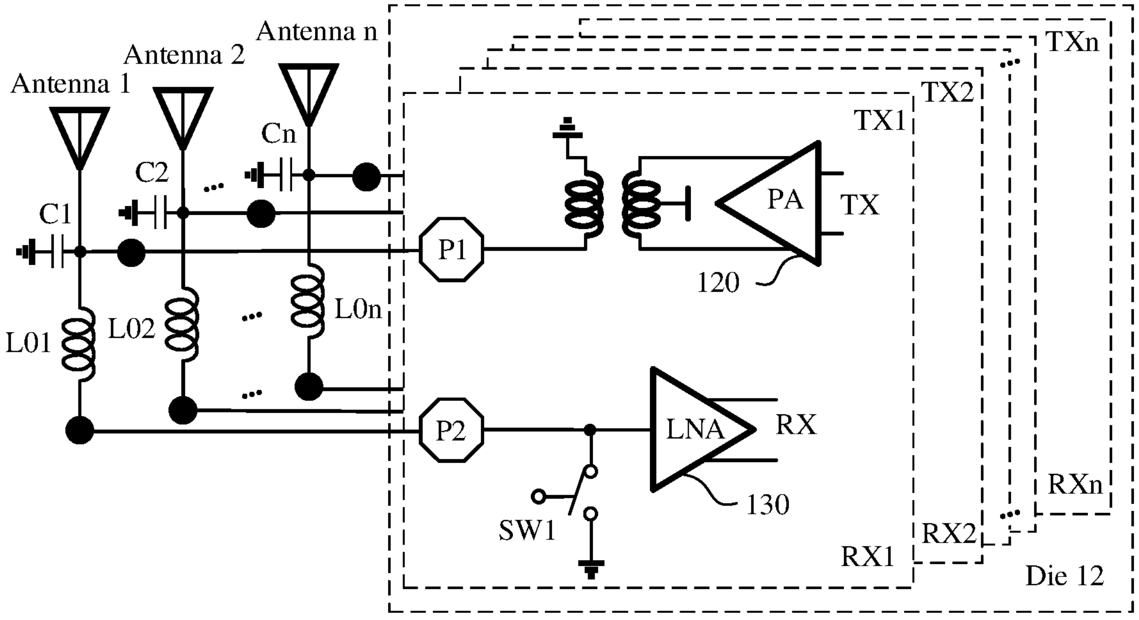

With reference to FIG. 7, as shown in FIG. 8, the transceiver apparatus includes n channels (n is a positive integer), and each channel may include one transceiver switch, one PA 120, and one LNA 130. Therefore, n transceiver switches, n PAs 120, and n LNAs 130 are correspondingly disposed in the n channels. Inductors L0 in the n transceiver switches are all disposed on the package substrate 11, and are respectively represented as an L01 to an L0*n*. n matching capacitors C are respectively represented as a Ci to a Cn. Transmission links corresponding to the n PAs 120 are respectively represented as a TX1 to a TXn. Receive links corresponding to the n LNA 130 are respectively represented as an RX1 to an RXn. In addition, antenna feedpoints 112 in the n transceiver switches are correspondingly connected to antennas, so that the n transceiver switches are correspondingly connected to the n antennas. The plurality of antennas are all disposed on the package substrate 11, and are respectively represented as an antenna 1 to an antenna n in FIG. 8.

It should be noted that, in FIG. 8, an operating principle of each of the n channels configured to receive a signal is similar to an operating principle of the apparatus configured to receive a signal in FIG. 7, and an operating principle of each channel configured to transmit a signal is similar to an operating principle of the apparatus configured to transmit a signal in FIG. 7. For details, refer to the foregoing related descriptions. Details are not described herein again in this embodiment of this application.

Each of the plurality of channels included in the transceiver apparatus may support receiving or transmission of a signal in one frequency band, or may support receiving or transmission of signals in a plurality of frequency bands. This is not specifically limited in this embodiment of this application.

The transceiver apparatus provided in this embodiment of this application may be applied to a phased array system (for example, a TDD phased array system). The inductors L0 in the plurality of channels in the apparatus are disposed on the package substrate 11. In comparison with the conventional technology, an area of an inductor L0 can be saved in each channel. This can greatly reduce a chip area of the phased array system. In addition, the inductors L0 in the plurality of channels are disposed on the package substrate 11. Therefore, a quality factor of the inductor L0 can be increased, and an insertion loss of the transceiver switch can be reduced. Further, when the transceiver apparatus uses the transceiver switch to implement receiving or transmitting, receiving sensitivity and transmission efficiency can be ensured.

In view of this, an embodiment of this application further provides a wireless communication apparatus. The wireless communication apparatus includes a baseband processing chip and a transceiver apparatus coupled to the baseband processing chip. The transceiver apparatus may be configured to provide a radio frequency signal for the baseband processing chip, and the baseband processing chip is configured to provide a digital signal processing capability. The transceiver apparatus includes a package substrate and a die, and a transceiver switch is disposed in the apparatus. The transceiver switch includes an antenna feedpoint, a transmit feedpoint and a receive feedpoint that are coupled to the antenna feedpoint, and a first metal connection line that are disposed on the package substrate, and the antenna feedpoint and the receive feedpoint are disposed at two ends of the first metal connection line. The transceiver switch further includes a first switch, a transmit pad, and a receive pad that are disposed on the die, a first terminal of the first switch is coupled to the receive pad, a second terminal of the first switch is coupled to a ground terminal of the die, the receive pad is coupled to the receive feedpoint, and the transmit pad is coupled to the transmit feedpoint. A PA and an LNA are further disposed on the die, the transmit pad is coupled to an output terminal of the PA, and the receive pad is coupled to an input terminal of the LNA. Optionally, the wireless communication apparatus may be a terminal, a base station, or the like, and the baseband processing chip in the wireless communication apparatus may be a baseband processor.

In a possible implementation, the wireless communication apparatus may include any transceiver apparatus shown in FIG. 1 to FIG. 8. For specific related descriptions of the transceiver apparatus, refer to the foregoing corresponding descriptions. Details are not described herein again in this embodiment of this application.

An embodiment of this application further provides a chipset. The chipset includes a baseband processing chip and a transceiver apparatus coupled to the baseband processing chip. The transceiver apparatus may be configured to provide a radio frequency signal for the baseband processing chip, and the baseband processing chip is configured to provide a digital signal processing capability. The transceiver apparatus may be any transceiver apparatus shown in FIG. 1 to FIG. 8. For specific related descriptions of the transceiver apparatus, refer to the foregoing corresponding descriptions. Details are not described herein again in this embodiment of this application.

According to another aspect of this application, a non-transitory computer-readable storage medium used with a computer is further provided. The computer includes software for creating an integrated circuit, the computer-readable storage medium stores one or more computer-readable data structures, and the one or more computer-readable data structures include optical mask data for manufacturing the circuit in any one of FIG. 1 to FIG. 8.

It should be noted that, embodiments of this application and the accompanying drawings are merely examples. Each MOS transistor in any embodiment or accompanying drawing may be a single MOS transistor that satisfies a required start-up gain or a required on-current; or may be a MOS transistor combination that is formed by connecting a plurality of MOS transistors in parallel and that satisfies the required start-up gain or the required on-current, that is, a sum of start-up gains corresponding to the plurality of MOS transistors is greater than or equal to the required start-up gain. Each capacitor in the embodiments of this application may be one capacitor that satisfies a required capacitance; or may be a capacitor combination that is formed by connecting a plurality of capacitors in parallel or in series and that satisfies the required capacitance, that is, a corresponding capacitance obtained after the plurality of capacitors are connected in parallel or in series is equal to the required capacitance. Each inductor in the embodiments of this application may be one inductor that satisfies a required inductance; or may be an inductor combination that is formed by connecting a plurality of inductors in parallel or in series and that satisfies the required inductance. Each resistor in the embodiments of this application may be one resistor that satisfies a required resistance; or may be a resistor combination that is formed by connecting a plurality of resistors in parallel or in series and that satisfies the required resistance, that is, a corresponding resistance obtained after the plurality of resistors are connected in parallel or in series is equal to the required resistance.

It should be understood that sequence numbers of the foregoing processes do not mean execution sequences in this application. The execution sequences of the processes should be determined according to functions and internal logic of the processes, and should not be construed as any limitation on the implementation processes of the embodiments of this application. The term "coupling" mentioned in this application is used for indicating interworking or interaction between different components, and may include a direct connection or an indirect connection performed by using another component.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A transceiver, comprising:

a package substrate and a die, wherein a major surface of the package substrate and a major surface of the die are parallel, and the major surface of the package substrate is over the major surface of the die;

wherein the transceiver comprises a transceiver switch that is implemented at least in part by the package substrate and the die, and wherein the transceiver switch comprises:

an antenna feedpoint disposed on the package substrate;

a transmit feedpoint and a receive feedpoint that are coupled to the antenna feedpoint and that are disposed on the package substrate;

a first transmission line comprised in the package substrate, wherein the antenna feedpoint and the receive feedpoint are disposed at two ends of the first transmission line, and the first transmission line is routed along the major surface of the package substrate;

a first switch comprised in the die, and a transmit pad and a receive pad that are disposed on the die, wherein a first terminal of the first switch is coupled to the receive pad, a second terminal of the first switch is coupled to a ground terminal of the die, the receive pad is coupled to the receive feedpoint, and the transmit pad is coupled to the transmit feedpoint;

a second transmission line comprised in the package substrate, wherein the antenna feedpoint and the transmit feedpoint are disposed at two ends of the second transmission line, and a length of the second transmission line between the antenna feedpoint and the transmit feedpoint is the same as a length of the first transmission line between the antenna feedpoint and the receive feedpoint, and each of the first transmission line and the second transmission line is a microstrip or a coplanar waveguide transmission line;

a second switch comprised in the die, wherein a first terminal of the second switch is coupled to the transmit pad, and a second terminal of the second switch is coupled to the ground terminal of the die; and a power amplifier (PA) and a low noise amplifier (LNA) comprised in the die, wherein the transmit pad is coupled to an output terminal of the PA and the receive pad is coupled to an input terminal of the LNA;

wherein the transceiver switch further comprises a second transformer comprised in the die, and the PA comprises a first PA and a second PA; and wherein the second transformer comprises a second primary coil and a second secondary coil, the second primary coil is coupled between the transmit pad and the ground terminal of the die, a first terminal of the second secondary coil is separately coupled to a positive differential output terminal of the first PA and a positive differential output terminal of the second PA, and a second terminal of the second secondary coil is separately coupled to a negative differential output terminal of the first PA and a negative differential output terminal of the second PA.

2. The transceiver according to claim 1, wherein the transceiver switch further comprises a second transistor and a third transistor that are comprised in the die, an electrode of the second transistor is coupled to the first terminal of the second secondary coil, another electrode of the second transistor is separately coupled to the positive differential output terminal of the first PA and the positive differential output terminal of the second PA, an electrode of the third transistor is coupled to the second terminal of the second secondary coil, and another electrode of the third transistor is separately coupled to the negative differential output terminal of the first PA and the negative differential output terminal of the second PA.

3. The transceiver according to claim 1, wherein the first PA is configured to transmit a radio frequency signal in a first frequency band, the second PA is configured to transmit a radio frequency signal in a second frequency band, and the first frequency band is different from the second frequency band.

4. The transceiver according to claim 1, wherein the transceiver switch further comprises a first transformer comprised in the die, and the LNA comprises a first LNA and a second LNA; and wherein the first transformer comprises a first primary coil and a first secondary coil, the first primary coil is coupled between the receive pad and the ground terminal of the die, and a first terminal of the first secondary coil is coupled to an input terminal of the first LNA and an input terminal of the second LNA.

5. The transceiver according to claim 4, wherein the transceiver switch further comprises a first transistor comprised in the die, an electrode of the first transistor is coupled to the input terminal of the first LNA and the input terminal of the second LNA, another electrode of the first transistor is coupled to the ground terminal of the die, and a control terminal of the first transistor is coupled to the first terminal of the first secondary coil.

6. The transceiver according to claim 4, wherein a second terminal of the first secondary coil is coupled to the ground terminal of the die by a decoupling capacitor.

7. The transceiver according to claim 4, wherein the first LNA is configured to receive a radio frequency signal in a first frequency band, the second LNA is configured to receive a radio frequency signal in a second frequency band, and the first frequency band is different from the second frequency band.

8. The transceiver according to claim 1, wherein the antenna feedpoint is connected to an antenna, and the antenna is disposed on the package substrate.

9. The transceiver according to claim 1, wherein the transceiver comprises a plurality of channels, and each channel of the plurality of channels comprises the transceiver switch, the PA, and the LNA.

10. The transceiver according to claim 1, wherein a structure of the first transmission line is the same as a structure of the second transmission line.

11. The transceiver according to claim 1, wherein the first transmission line and the second transmission line are meander transmission lines.

12. An apparatus, comprising:

a baseband processing chip; and a transceiver coupled to the baseband processing chip;

wherein the transceiver comprises a package substrate and a die, wherein a major surface of the package substrate and a major surface of the die are parallel, and the major surface of the package substrate is over the major surface of the die;

wherein the transceiver comprises a transceiver switch that is implemented at least in part by the package substrate and the die, and the transceiver switch comprises:

an antenna feedpoint disposed on the package substrate;

a transmit feedpoint and a receive feedpoint that are coupled to the antenna feedpoint and that are disposed on the package substrate;

a first transmission line comprised in the package substrate, wherein the antenna feedpoint and the receive feedpoint are disposed at two ends of the first transmission line, and the first transmission line is routed along the major surface of the package substrate;

a first switch comprised in the die, and a transmit pad, and a receive pad that are disposed on the die, wherein a first terminal of the first switch is coupled to the receive pad, a second terminal of the first switch is coupled to a ground terminal of the die, the receive pad is coupled to the receive feedpoint, and the transmit pad is coupled to the transmit feedpoint;

a second transmission line comprised in the package substrate, wherein the antenna feedpoint and the transmit feedpoint are disposed at two ends of the second transmission line, and a length of the second transmission line between the antenna feedpoint and the transmit feedpoint is the same as a length of the first transmission line between the antenna feedpoint and the receive feedpoint, and each of the first transmission line and the second transmission line is a microstrip or a coplanar waveguide transmission line;

a second switch comprised in the die, wherein a first terminal of the second switch is coupled to the transmit pad, and a second terminal of the second switch is coupled to the ground terminal of the die; and a power amplifier (PA) and a low noise amplifier (LNA) comprised in the die, wherein the transmit pad is coupled to an output terminal of the PA, and the receive pad is coupled to an input terminal of the LNA;

wherein the transceiver switch further comprises a second transformer comprised in the die, and the PA comprises a first PA and a second PA; and wherein the second transformer comprises a second primary coil and a second secondary coil, the second primary coil is coupled between the transmit pad and the ground terminal of the die, a first terminal of the second secondary coil is separately coupled to a positive differential output terminal of the first PA and a positive differential output terminal of the second PA, and a second terminal of the second secondary coil is separately coupled to a negative differential output terminal of the first PA and a negative differential output terminal of the second PA.

13. The apparatus according to claim 12, further comprising:

a printed circuit board, wherein the baseband processing chip and the transceiver are fixed on the printed circuit board.

14. The apparatus according to claim 12, wherein the apparatus is a terminal.

15. The apparatus according to claim 12, wherein a structure of the first transmission line is the same as a structure of the second transmission line.

16. The apparatus according to claim 12, wherein the first transmission line and the second transmission line are meander transmission lines.

17. The apparatus according to claim 12, wherein the transceiver comprises a plurality of channels, and each channel of the plurality of channels comprises the transceiver switch, the PA, and the LNA.

18. A chipset, comprising:

a baseband processing chip; and a transceiver coupled to the baseband processing chip, wherein the transceiver comprises a package substrate and a die, wherein a major surface of the package substrate and a major surface of the die are parallel, and the major surface of the package substrate is over the major surface of the die;

wherein the transceiver comprises a transceiver switch that is implemented at least by part by the package substrate and the die, and the transceiver switch comprises:

an antenna feedpoint disposed on the package substrate;

a transmit feedpoint and a receive feedpoint that are coupled to the antenna feedpoint and that are disposed on the package substrate;

a first transmission line comprised in the package substrate, wherein the antenna feedpoint and the receive feedpoint are disposed at two ends of the first transmission line, and the first transmission line is routed along the major surface of the package substrate;

a first switch comprised in the die, and a transmit pad, and a receive pad that are disposed on the die, wherein a first terminal of the first switch is coupled to the receive pad, a second terminal of the first switch is coupled to a ground terminal of the die, the receive pad is coupled to the receive feedpoint, and the transmit pad is coupled to the transmit feedpoint;

a second transmission line comprised in the package substrate, wherein the antenna feedpoint and the transmit feedpoint are disposed at two ends of the second transmission line, and a length of the second transmission line between the antenna feedpoint and the transmit feedpoint is the same as a length of the first transmission line between the antenna feedpoint and the receive feedpoint, and each of the first transmission line and the second transmission line is a microstrip or a coplanar waveguide transmission line;

a second switch comprised in the die, wherein a first terminal of the second switch is coupled to the transmit pad, and a second terminal of the second switch is coupled to the ground terminal of the die; and a power amplifier (PA) and a low noise amplifier (LNA) comprised in the die, wherein the transmit pad is coupled to an output terminal of the PA, and the receive pad is coupled to an input terminal of the LNA;

wherein the transceiver switch further comprises a second transformer comprised in the die, and the PA comprises a first PA and a second PA; and wherein the second transformer comprises a second primary coil and a second secondary coil, the second primary coil is coupled between the transmit pad and the ground terminal of the die, a first terminal of the second secondary coil is separately coupled to a positive differential output terminal of the first PA and a positive differential output terminal of the second PA, and a second terminal of the second secondary coil is separately coupled to a negative differential output terminal of the first PA and a negative differential output terminal of the second PA.

19. The chipset according to claim 18, wherein the transceiver comprises a plurality of channels, and each channel of the plurality of channels comprises the transceiver switch, the PA, and the LNA.

20. The chipset according to claim 18, wherein the first transmission line and the second transmission line are meander transmission lines.

* * * * *